2,950,247

INCREASING PERMEABILITY OF SUBSURFACE FORMATIONS

William J. McGuire, Jr., and Loyd R. Kern, Irving, Tex., assignors to The Atlantic Refining Company, Philadelphia, Pa., a corporation of Pennsylvania No Drawing. Filed May 16, 1957, Ser. No. 659,496

8 Claims. (Cl. 252—8.55)

The present invention relates to the treatment of subsurface formations to increase their permeability to fluids. More particularly, the present invention relates to the treatment of subsurface formations to increase their permeability to fluids by providing porous, lateral flow channels or fractures extending from a well bore into selected formations forming the walls of the well bore.

In the art of increasing the permeability to fluids of subsurface formations, it is known that improved productivity of oil or gas from hydrocarbon-bearing formations and improved injectivity of water into water-disposal formations can be obtained by creating or enlarging flow channels or fractures extending from the well bore into such preselected formations. Such fractures may be created or existing fractures may be enlarged by various methods involving the application of high pressures to fluids disposed in the well bore adjacent the formation to be treated. In some cases, the mere opening of one or more flow channels or fractures will, in itself, greatly increase the permeability of the formation. However, in a majority of treatments, it is also necessary to deposit a propping agent in the open fracture in order to prevent it from closing off and thereby substantially reducing the advantage gained by the initial opening of the fracture. This introduction of propping agents is generally carried out by suspending the propping agent in a fluid and forcing the fluid into the open channel. Finally, the introduction of the propping agent is sometimes followed by a flushing step. Depending upon the nature of the fluids employed to open the fracture and to carry the propping agent into the fracture, such flushing is performed by circulating a third fluid into the formation to act as a solvent or diluent; or by merely producing the formation fluids, thereby utilizing the formation fluids as the diluting or solvating agent.

In recent years, considerable attention has been directed to the nature of the various fluids employed to open the fracture and to carry the propping agent into the fracture. On the other hand, little or no attention has been directed to the materials used as propping agents or their properties. As a matter of fact, sand has been universally employed as a propping agent ever since widespread commercial application of fracturing was begun, and it is still in use today. The only improvement which has been made in this phase of the fracturing art is the use of more carefully graded sand of generally spherical shape as opposed to sand of widely varying size and irregular shape.

It is, accordingly, an object of the present invention to provide an improved method of increasing the permeability of subsurface formations.

Another object of this invention is to provide an improved method of propping fractures in subsurface formations.

A still further object of the present invention is to provide an improved method of propping fractures in subsurface formations whereby substantially increased permeability to fluids is obtained.

These and other objects of the present invention will be apparent from the following detailed description.

In present day fracturing operations, it is the general practice to employ screened sand ranging in size from 20 to 40 mesh (0.03 to 0.017 inch in diameter) as a propping agent. Depending upon the pressure exerted by the walls of the fracture, sand as large as 10 to 20 mesh (0.08 to 0.03 inch in diameter) has been employed in a few instances; but, beyond this range, it has been concluded by those skilled in the art that no useful purpose is served by employing larger size sand. The major factor which prevents the use of large size sand as a propping agent is the fact that fragmentation of the sand occurs at the pressures generally encountered in subsurface formations. Accordingly, in deep formations, where significant increases in formation permeability are most difficult to achieve because of a combination of factors, 20 to 40 mesh sand is employed. As the depth, and consequently the pressure, becomes greater, 40 to 60 mesh sand is employed, thus definitely ruling out the use of 10 to 20 mesh sand in deep formations and limiting its use to extremely shallow formations. Another contributing factor which has led those skilled in the art away from the use of large size sand is the danger of bridging or sanding-up the fracture within a short distance of the well bore.

Contrary to the present-day practices and recommendations of those skilled in the art, it has been found, in accordance with the present invention, that these supposed disadvantages of large particle size materials can be overcome and fractures of substantially improved permeability can be obtained by introducing into an open fracture manufactured, formable materials selected from the group consisting of metallic, ceramic, and plastic particles of generally spherical shape having a diameter in excess of 0.03 inch, and preferably in excess of 0.08 inch, and which are capable of supporting a load above 40 pounds per particle, and preferably above 100 pounds per particle, without fragmentation.

It has been found that steel shot, tabular alumina spheres, aluminum spheres, glass spheres, plastic spheres, and other manufactured, formable materials having diameters in excess of about 0.03 inch will withstand pressures well in excess of 40 pounds per particle and such materials having diameters above 0.08 inch will withstand pressures in excess of 100 pounds per particle up to as high as 1,500 pounds per particle or more. On the other hand, naturally occurring materials such as sand and gravel of equivalent particle size break into small fragments well below 100 pounds per particle and in most cases below 40 pounds per particle unless the particles are hand picked. These same low strengths are also characteristic of other naturally occurring granular materials, such as, sandstone and granite, which would be expected, according to textbook ratings of the strength of these materials, to be extremely hard and durable. Manufactured, formable materials having diameters below about 0.03 inch exhibit poor resistance to fragmentation, and the permeabilities obtained are essentially equivalent to those obtained with sand of this same size. It is believed that the distinction between the naturally occurring materials and the manufactured, formable materials of this invention is primarily due to the fact that the naturally occurring materials generally have oriented crystalline structures which provide cleavage planes along which the particles will fail under high pressuers while the manufactured, formable materials are either amorphous in structure or have non-oriented crystalline structures. In any event, the resistance to fragmentation of naturally occurring materials decreases rapidly for particles above about 0.03 inch in diameter while the resistance to fragmentation of manufactured, formable materials generally increases rapidly when particles above this size are considered.

The advantages of employing the large size propping agents contemplated by the present invention may be illustrated by a comparison of the permeabilities which can be obtained when propping agents of conventional size are employed with the permeabilities which can be obtained by the use of the propping agents of the present invention. The measured average permeability of a fracture filled with conventional 20 to 40 mesh sand has been found to be approximately 150 darcies. If this same fracture were filled with a propping agent which has a diameter of 0.03 inch, a permeability of approximately 246 darcies can be expected. Similarly, when a propping agent having a diameter of 0.08 inch is employed, a permeability of 1,750 darcies can be obtained, and for a propping agent of 0.25 inch as high as 17,000 darcies. Intermediate permeabilities will, of course, be obtained with materials of intermediate diameter; and such permeabilities can be estimated with fair accuracy by applying the formula which states that the ratio of the permeabilities of beds of two materials of differing diameters is approximately equal to the ratio of the square of the diameters of the two materials.

The comparative permeabilities set forth above are, of course, based upon completely filling the fracture with propping agent or at least comparing a sand-filled fracture of a particular size with the same size fracture filled with the propping agent of the present invention and having essentially no load applied thereto. It has also been found, however, that the large-size propping agents of the instant invention may be employed in quantities less than that required to completely fill the fracture and that the resultant permeability of the fracture will still be substantially higher than that which would be obtained if the fracture were filled with conventional size propping agents. For example, even though the propping agent of the instant invention were deposited in a fracture having a width twice as great as the diameter of the propping agent in an amount which would deposit a single layer of the propping agent in the fracture, the resultant permeability would still be many times that which can be obtained by the use of small size propping agents. Thus, even though a fracture is permitted to partially close, substantial advantages will be obtained by employing the large size propping agents of the instant invention. It has also been observed that where concentrations of propping agent less than the amount sufficient to completely fill the fracture are deposited in a vertical fracture, and such propping agent is permitted to settle at a rate greater than that heretofore believed practical, the propping agent will be deposited in the bottom of the fracture leaving an open channel at the top of the fracture. The advantages of producing a flow channel of this character are believed obvious since the conductivity of an open crack, expressed in darcies, is equal to approximately $5.5 \times 10^7 w^2$, where $w$ is the width of the fracture in inches. This observed action of propping agents in a vertical fracture is particularly interesting when certain of the manufactured, formable materials set forth herein are considered. Steel shot and like materials of high specific gravity are obviously more difficult to suspend in a carrying fluid than sand or other light materails. Accordingly, in order to attain the same suspending properties as those considered necessary for the introduction of sand, much larger quantities of viscifying agents or other bodying agents would be required. Therefore, from an economic standpoint, where a vertical fracture is being treated, smaller quantities of propping agent can be employed and a higher settling rate can be justified without seriously affecting the ultimate permeability of the fracture and in some cases providing a better ultimate permeability.

The necessity of employing manufactured, formable materials which will withstand extremely high pressures without fragmentation can be illustrated by the results obtained in a series of laboratory tests. In these tests, a core plug, obtained from an oil-bearing formation located 9,000 feet below the surface was fractured longitudinally. The fracture was then packed with various sands under conditions such that the packing was equivalent to that obtained in a subsurface fracture. The permeability along the fracture was then measured while the fracture walls were pushed together under simulated overburden pressures. The maximum pressure applied was 3,000 p.s.i., representing 6,000 to 9,000 feet of overburden above a vertically fractured formation. A 40 to 60 mesh sand deposited in the fracture showed permeabilities of 78 darcies at 0 p.s.i. and 35 darcies at 3,000 p.s.i. while a 20 to 40 mesh sand exhibited permeabilities of 135 at 0 p.s.i. and 43 at 3,000 p.s.i. In both instances the decrease in permeability in going from 0 to 3,000 p.s.i. was due almost exclusively to tighter packing of the sand under pressure and no appreciable fragmentation of the sand occurred. However, when a 10 to 20 mesh sand was employed, permeabilities of 485 darcies at 0 p.s.i. and 48 darcies at 3,000 p.s.i. resulted. In this case, the sand had undergone substantial fragmentation and the small fragments had apparently filled the void spaces initially existing between the large grains at 0 p.s.i. In a similar test of gravel having an average diameter of 0.08 to 0.25 inch, permeabilities of 250 darcies at 700 p.s.i., 50 darcies at 1,360 p.s.i. and 2 darcies at 2,000 p.s.i. were measured. On the other hand, glass spheres 0.125 inch in diameter gave permeabilities of 8,600 darcies at 0 p.s.i., 6,900 darcies at 1,000 p.s.i. and 5,700 darcies at 3,000 p.s.i. Thus, it can be seen that the decrease in permeability of the glass sphere packing was of the same order of magnitude as that previously observed to be due to closer packing of the material. In addition, no appreciable fragmentation was observed. In fact, the particular glass spheres tested also exhibit strengths of about 130 pounds per particle and, therefore, are suitable for use under much higher pressure conditions without any change in permeability aside from that due to closer packing.

During the course of the tests summarized above, it was also observed that fragmentation is more severe along the walls of the fracture than within the body of the sand packing. Accordingly, the advantages of employing manufactured, formable materials having a high resistance to fragmentation are even more pronounced when a single layer of propping agent is employed in accordance with the preferred method of practicing the instant invention.

The manufactured, formable materials of the present invention also have the additional advantage of being more uniform in size than the sands presently employed since these sands are graded over a fairly wide range and the samller particles tend to deposit in the spaces between the larger particles thus reducing the effective permeability.

In the preferred mode of practicing the present invention, a fluid, such as, crude oil, kerosene, acid, or water, which may or may not contain an agent to prevent fluid loss into the formation, is pumped into the well bore under a pressure sufficient to fracture the formation of interest or enlarge an existing fracture in such formation. Thereafter a fluid containing the propping agent of the instant invention is forced into the fracture to deposit the propping agent therein. This second fluid may be an unmodified crude oil or water, as in the first step, if sufficient pumping capacity is available. However, from a safety standpoint, it is preferable to employ a fluid which has been modified to increase its power to maintain the propping agent in suspension for a reasonable length of time and also to reduce fluid loss. Finally, the pressure is released and the natural formation fluids, initially including the fracturing and propping agent carrying fluids, are produced. Depending upon the particular fluids employed in the first two steps, it is sometimes desirable to flush the formation with a third fluid, generally crude oil or water as the case may dictate, prior to placing the well on production.

As has been pointed out above, the minimum size of manufactured, formable materials to be employed in accordance with the present invention is 0.03 inch. Obviously, the maximum size of these materials is limited by the width of the fracture to be propped, which width can be estimated with fair accuracy for any given formation. Accordingly, the diameter of the propping agent employed should be less than the width of the fracture to be propped. For all practical purposes, propping agents having a diameter of less than 0.25 inch should be employed and such agents having a diameter approximately one-half the estimated width of the fracture are preferred. Propping agents of this diameter or slightly larger will be deposited in the fracture as a single layer and the preferred mode of practicing the present invention will thus be accomplished.

The load carrying capacity of propping agents to be employed in accordance with the present invention may be readily determined by laboratory measurements. These measurements consist of placing the material to be tested between two flat plates, applying pressure at an increasing rate, either continuously or by small increments, and observing the applied pressure at which the material breaks. The plates employed may be either rock segments or hard metallic plates. However, it is preferred that metallic plates having a strength greater than that of the material being tested be employed, since the particles tend to become embedded in soft metallic plates and rock segments and slightly erroneous measurements will result. In addition, the material may be tested either by individually testing a plurality of particles and averaging the results, or by testing a bed of the material having a concentration equal to that to be employed in the actual formation fracture. Again the latter procedure is preferred, since the latter procedure parallels the conditions under which the material will be employed and it has been found by actual test that the average measured strength of a plurality of individual particles will generally be nearly twice as great as the measured strength of a bed of the material. This difference apparently results from a few very weak particles in the bed failing at low pressures and, as they fail, a rapid increase in the effective load per particle on the remaining particles occurs to the extent that the load per particle exceeds that of the stronger particles at a comparatively low overall pressure. In any event, it has been found that the manufactured, formable materials of the present invention will support loads above 40 pounds per particle when measurements are made on a bed of the material; whereas, the propping agents of the prior art fail at loads of about 7 pounds per particle under the same conditions.

It is to be understood that the specific examples cited herein and the mode of operation specifically set forth above are merely illustrative and that other variations and modifications may be practiced without departing from the scope of the present invention. For example, mixtures of the propping agents of this invention may be employed, such as a mixture of aluminum and steel spheres, where the advantage of the high load carrying capacity of steel is desirable. Similarly, where the pressure conditions are not severe, mixtures of the propping agents of this invention with naturally occurring materials of equivalent diameter may be employed in order to provide a more economical propping material.

We claim:

1. In a method for increasing the permeability to fluids of a subsurface earth formation having at least one fracture extending from the wall of a well bore radially into the formation, the improvement comprising forcing into said fracture a fluid suspension of a manufactured, formable material selected from the group consisting of alumina and aluminum particles of generally spherical shape and mixtures thereof, said particles being characterized by having a diameter in excess of 0.03 inch and being capable of supporting a load above 40 pounds per particle without fragmentation.

2. A method in accordance with claim 1, wherein the particles of generally spherical shape are alumina.

3. A method in accordance with claim 1 wherein the particles of generally spherical shape are aluminum.

4. In a method for increasing the permeability to fluids of a subsurface earth formation having at least one fracture extending from the wall of a well bore radially into the formation, the improvement comprising forcing into said fracture a fluid suspension of a manufactured, formable material selected from the group consisting of alumina and aluminum particles of generally spherical shape and mixtures thereof, said particles being characterized by having a diameter in excess of 0.03 inch and such that a single layer of said particles will be deposited in said fracture, and said particles being further characterized by being capable of supporting a load of above 40 pounds per particle without fragmentation.

5. In a method for increasing the permeability to fluids of a subsurface earth formation having at least one fracture extending from the wall of a well bore radially into the formation, the improvement comprising forcing into said fracture a fluid suspension of a manufactured, formable material selected from the group consisting of alumina and aluminum particles of generally spherical shape and mixtures thereof, said particles being characterized by having a diameter approximately equal to one-half the estimated diameter of said fracture and in excess of 0.03 inch and being further characterized by being capable of supporting a load above 40 pounds per particle without fragmentation.

6. In a method for increasing the permeability to fluids of a subsurface earth formation having at least one fracture extending from the wall of a well bore radially into the formation, the improvement comprising forcing into said fracture a fluid suspension of a manufactured, formable material selected from the group consisting of alumina and aluminum particles of generally spherical shape and mixtures thereof, said particles being characterized by having a diameter in excess of 0.08 inch and being capable of supporting a load above 40 pounds per particle without fragmentation.

7. A composition for propping a fracture in a subsurface earth formation comprising a fluid suspension of a manufactured, formable material selected from the group consisting of alumina and aluminum particles of generally spherical shape and mixtures thereof, said particles being characterized by having a diameter between 0.03 inch and 0.25 inch and being capable of supporting a load above 40 pounds per particle without fragmentation.

8. A composition for propping a fracture in a subsurface earth formation comprising a fluid suspension of a manufactured, formable material selected from the group consisting of alumina and aluminum particles of generally spherical shape and mixtures thereof, said particles being characterized by having a diameter between 0.08 inch and 0.25 inch and being capable of supporting a load above 40 pounds per particle without fragmentation.

References Cited in the file of this patent

UNITED STATES PATENTS

| | | |
|---|---|---|
| 2,667,224 | Howard | Jan. 26, 1954 |
| 2,772,737 | Bond et al. | Dec. 4, 1956 |
| 2,802,531 | Cardwell et al. | Aug. 13, 1957 |
| 2,859,819 | Trott | Nov. 11, 1958 |